US011522877B2

(12) United States Patent
McLean (10) Patent No.: US 11,522,877 B2
(45) Date of Patent: Dec. 6, 2022

(54) SYSTEMS AND METHODS FOR IDENTIFYING MALICIOUS ACTORS OR ACTIVITIES

(71) Applicant: Secureworks Corp., Wilimington, DE (US)

(72) Inventor: Lewis McLean, Edinburgh (GB)

(73) Assignee: Secureworks Corp., Wilmington, DE (US)

( * ) Notice: Subject to any disclaimer, the term of this patent is extended or adjusted under 35 U.S.C. 154(b) by 410 days.

(21) Appl. No.: 16/715,213

(22) Filed: Dec. 16, 2019

(65) Prior Publication Data
US 2021/0185057 A1 Jun. 17, 2021

(51) Int. Cl.
H04L 29/06 (2006.01)
H04L 9/40 (2022.01)
G06F 16/23 (2019.01)
G06N 20/00 (2019.01)

(52) U.S. Cl.
CPC ...... H04L 63/1416 (2013.01); G06F 16/2379 (2019.01); G06N 20/00 (2019.01)

(58) Field of Classification Search
CPC .. H04L 63/1416; G06F 16/2379; G06N 20/00
See application file for complete search history.

(56) References Cited

U.S. PATENT DOCUMENTS 5,937,066 A 8/1999 Gennaro et al.
6,357,010 B1 3/2002 Viets et al.
7,269,578 B2 9/2007 Sweeney
7,331,061 B1 2/2008 Ramsey et al.
7,492,957 B1 2/2009 Bonhaus
(Continued)

FOREIGN PATENT DOCUMENTS

EP 3599753 A1 1/2020
RU 2738344 C1 12/2020
(Continued)

OTHER PUBLICATIONS

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.
(Continued)

*Primary Examiner* — Mahfuzur Rahman
(74) *Attorney, Agent, or Firm* — Womble Bond Dickinson (US) LLP (57) ABSTRACT

With the systems and methods described herein, one or more security counter measures can be applied to received security data, e.g., by an initial detector, for identifying signatures or patterns in the received security data and determining whether to promote identifiers (e.g., URLs, IP addresses, domains, etc.) to an attacker learning system. If the identified signatures or patterns and/or the identifiers related thereto are determined to meet a threshold criterion, the identifiers are promoted to the attacker learning system. At the attacker learning system, a machine learning model is applied to promoted identifiers and security data associated therewith for determining whether the identifiers are malicious and should be added or otherwise included in an attacker database. Other aspects also are described.

22 Claims, 3 Drawing Sheets

(56) References Cited

U.S. PATENT DOCUMENTS

| | | |
|---|---|---|
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 7,926,113 B1 | 4/2011 | Gula et al. |
| 8,079,081 B1 | 12/2011 | Lavrik et al. |
| 8,122,495 B2 | 2/2012 | Ramsey et al. |
| 8,156,553 B1 | 4/2012 | Church et al. |
| 8,327,419 B1 | 12/2012 | Korablev et al. |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,793,786 B2 | 7/2014 | Bhesania et al. |
| 8,805,881 B2 | 8/2014 | Hom et al. |
| 8,832,048 B2 | 9/2014 | Lim |
| 8,839,414 B2 | 9/2014 | Mantle et al. |
| 8,898,777 B1 | 11/2014 | Oliver |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,130,988 B2 | 9/2015 | Seifert et al. |
| 9,137,262 B2 | 9/2015 | Qureshi et al. |
| 9,191,400 B1 * | 11/2015 | Ptasinski ................ H04L 69/22 |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 | 1/2017 | Fleury et al. |
| 9,548,994 B2 | 1/2017 | Pearcy et al. |
| 9,558,352 B1 | 1/2017 | Dennison et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,710,672 B2 | 7/2017 | Braun |
| 9,712,549 B2 * | 7/2017 | Almurayh ........... H04L 63/1425 |
| 9,742,559 B2 | 8/2017 | Christodorescu et al. |
| 9,767,302 B2 | 9/2017 | Lim |
| 9,805,202 B2 | 10/2017 | Medeiros et al. |
| 9,910,986 B1 | 3/2018 | Saxe |
| 9,973,524 B2 | 5/2018 | Boyer et al. |
| 10,050,992 B2 | 8/2018 | Thyni et al. |
| 10,063,582 B1 | 8/2018 | Feng et al. |
| 10,116,500 B1 | 10/2018 | Long et al. |
| 10,311,231 B1 | 6/2019 | Kayyoor |
| 10,356,125 B2 | 7/2019 | Goutal et al. |
| 10,382,489 B2 | 8/2019 | Das et al. |
| 10,419,903 B2 | 9/2019 | Singh et al. |
| 10,425,223 B2 | 9/2019 | Roth et al. |
| 10,474,820 B2 | 11/2019 | Manadhata |
| 10,491,632 B1 | 11/2019 | Natarajan |
| 10,567,407 B2 | 2/2020 | Tang et al. |
| 10,594,713 B2 | 3/2020 | McLean |
| 10,601,865 B1 | 3/2020 | Mesdaq et al. |
| 10,728,263 B1 | 7/2020 | Neumann |
| 10,762,206 B2 | 9/2020 | Titonis et al. |
| 10,834,128 B1 | 11/2020 | Rajogopalan et al. |
| 10,853,431 B1 | 12/2020 | Lin et al. |
| 10,915,828 B2 | 2/2021 | Qhi |
| 11,044,263 B2 | 6/2021 | McLean et al. |
| 11,165,862 B2 | 11/2021 | Austin et al. |
| 11,275,831 B1 * | 3/2022 | Aouad .................. G06N 20/10 |
| 2002/0129135 A1 | 9/2002 | Delany et al. |
| 2005/0060295 A1 | 3/2005 | Gould et al. |
| 2005/0138204 A1 | 6/2005 | Iyer et al. |
| 2005/0288939 A1 | 12/2005 | Peled et al. |
| 2006/0012815 A1 | 1/2006 | Ebner et al. |
| 2006/0037076 A1 | 2/2006 | Roy |
| 2006/0195575 A1 | 8/2006 | Delany et al. |
| 2006/0253447 A1 | 11/2006 | Judge |
| 2007/0192867 A1 | 8/2007 | Miliefsky |
| 2007/0226248 A1 | 9/2007 | Darr |
| 2007/0226807 A1 | 9/2007 | Ginter et al. |
| 2008/0077593 A1 | 3/2008 | Abrams et al. |
| 2008/0219334 A1 | 9/2008 | Brainos et al. |
| 2008/0255997 A1 | 10/2008 | Bluhm et al. |
| 2008/0262991 A1 | 10/2008 | Kapoor |
| 2008/0320000 A1 | 12/2008 | Gaddam |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2010/0251329 A1 | 9/2010 | Wei et al. |
| 2011/0004771 A1 | 1/2011 | Matsushima et al. |
| 2011/0179492 A1 | 7/2011 | Markopoulou et al. |
| 2011/0276604 A1 | 11/2011 | Hom et al. |
| 2011/0276716 A1 | 11/2011 | Coulson |
| 2012/0072983 A1 | 3/2012 | McCusker et al. |
| 2012/0117640 A1 | 5/2012 | Ramsey et al. |
| 2012/0185275 A1 | 7/2012 | Loghmani |
| 2012/0246730 A1 | 9/2012 | Raad |
| 2012/0254333 A1 | 10/2012 | Chandramouli |
| 2012/0260341 A1 | 10/2012 | Chan et al. |
| 2013/0104191 A1 | 4/2013 | Peled et al. |
| 2013/0138428 A1 | 5/2013 | Chandramouli |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko et al. |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0051432 A1 | 2/2014 | Gupta et al. |
| 2014/0222712 A1 | 8/2014 | Samaha et al. |
| 2014/0373151 A1 | 12/2014 | Webb et al. |
| 2015/0040225 A1 | 2/2015 | Coates et al. |
| 2015/0074390 A1 | 3/2015 | Stoback |
| 2015/0135287 A1 | 5/2015 | Medeiros et al. |
| 2015/0135320 A1 | 5/2015 | Coskun |
| 2015/0156212 A1 | 6/2015 | Khatri et al. |
| 2015/0186618 A1 | 7/2015 | Poorvin |
| 2015/0193231 A1 | 7/2015 | Goldberg |
| 2015/0222652 A1 | 8/2015 | Ramsey et al. |
| 2015/0271047 A1 | 9/2015 | McLean |
| 2015/0324457 A1 | 11/2015 | McLean |
| 2016/0006749 A1 | 1/2016 | Cohen et al. |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey |
| 2016/0139886 A1 | 5/2016 | Perdriau et al. |
| 2016/0156655 A1 | 6/2016 | Lotem et al. |
| 2016/0182546 A1 | 6/2016 | Coates et al. |
| 2016/0241591 A1 | 8/2016 | Ramsey et al. |
| 2016/0277423 A1 | 9/2016 | Apostolescu et al. |
| 2016/0313709 A1 | 10/2016 | Biesdorf et al. |
| 2016/0337400 A1 | 11/2016 | Gupta |
| 2016/0342805 A1 | 11/2016 | Lim |
| 2016/0378978 A1 | 12/2016 | Singla |

(56) References Cited

U.S. PATENT DOCUMENTS

| | | |
|---|---|---|
| 2017/0026343 A1 | 1/2017 | Wardman |
| 2017/0063893 A1 | 3/2017 | Franc et al. |
| 2017/0063905 A1 | 3/2017 | Muddu et al. |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0208084 A1 | 7/2017 | Steelman et al. |
| 2017/0208085 A1 | 7/2017 | Steelman et al. |
| 2017/0024475 A1 | 8/2017 | Kinder et al. |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244754 A1 | 8/2017 | Kinder et al. |
| 2017/0244762 A1 | 8/2017 | Kinder et al. |
| 2017/0318033 A1* | 11/2017 | Holland ............. H04L 63/1416 |
| 2017/0318034 A1* | 11/2017 | Holland ............. H04W 12/126 |
| 2017/0359368 A1 | 12/2017 | Hodgman |
| 2018/0077189 A1 | 3/2018 | Doppke |
| 2018/0089574 A1 | 3/2018 | Goto |
| 2018/0091306 A1 | 3/2018 | Antonopoulos et al. |
| 2018/0103010 A1 | 4/2018 | Diaz Cuellar et al. |
| 2018/0124073 A1 | 5/2018 | Scherman et al. |
| 2018/0124085 A1 | 5/2018 | Frayman et al. |
| 2018/0152480 A1 | 5/2018 | Kinder et al. |
| 2018/0181599 A1 | 6/2018 | Crabtree et al. |
| 2018/0288198 A1 | 10/2018 | Pope et al. |
| 2018/0367550 A1 | 12/2018 | Musuvathi et al. |
| 2019/0014149 A1 | 1/2019 | Cleveland et al. |
| 2019/0037406 A1 | 1/2019 | Wash |
| 2019/0050554 A1 | 2/2019 | Fiske |
| 2019/0068630 A1 | 2/2019 | Valecha et al. |
| 2019/0095801 A1 | 3/2019 | Saillet et al. |
| 2019/0102554 A1* | 4/2019 | Luo ..................... G06F 21/554 |
| 2019/0102646 A1 | 4/2019 | Redmon |
| 2019/0104154 A1 | 4/2019 | Kumar et al. |
| 2019/0109717 A1 | 4/2019 | Reddy et al. |
| 2019/0122258 A1 | 4/2019 | Bramberger et al. |
| 2019/0132344 A1 | 5/2019 | Lem et al. |
| 2019/0141079 A1 | 5/2019 | Vidas et al. |
| 2019/0149564 A1 | 5/2019 | McLean |
| 2019/0173919 A1 | 6/2019 | Irimie |
| 2019/0242718 A1 | 8/2019 | Siskind et al. |
| 2019/0258807 A1* | 8/2019 | DiMaggio ............ G06F 21/577 |
| 2019/0297096 A1 | 9/2019 | Ahmed et al. |
| 2019/0342296 A1 | 11/2019 | Anandam et al. |
| 2019/0347433 A1 | 11/2019 | Chakravorty et al. |
| 2019/0377832 A1 | 12/2019 | McLean et al. |
| 2019/0379678 A1 | 12/2019 | McLean et al. |
| 2020/0036750 A1 | 1/2020 | Bahnsen |
| 2020/0036751 A1 | 1/2020 | Kohavi |
| 2020/0186544 A1 | 6/2020 | Dichiu et al. |
| 2020/0195683 A1 | 6/2020 | Kuppa et al. |
| 2020/0259791 A1 | 8/2020 | Garcia et al. |
| 2020/0274894 A1 | 8/2020 | Argoeti et al. |
| 2020/0285737 A1* | 9/2020 | Kraus ................... G06F 21/554 |
| 2020/0285952 A1* | 9/2020 | Liu ......................... G06N 3/08 |
| 2020/0314122 A1 | 10/2020 | Jones et al. |
| 2020/0336497 A1 | 10/2020 | Seul et al. |
| 2020/0351285 A1* | 11/2020 | Eisenkot ............. H04L 63/1441 |
| 2020/0351302 A1 | 11/2020 | Kyle |
| 2020/0351307 A1 | 11/2020 | Vidas et al. |
| 2020/0356665 A1 | 11/2020 | Denney et al. |
| 2020/0358795 A1 | 11/2020 | Urbanski et al. |
| 2020/0358819 A1 | 11/2020 | Bowditch et al. |
| 2020/0364338 A1 | 11/2020 | Ducau et al. |
| 2020/0394309 A1 | 12/2020 | Angelo et al. |
| 2021/0067562 A1 | 3/2021 | Kinder et al. |
| 2021/0109797 A1 | 4/2021 | Zhou |
| 2021/0112087 A1 | 4/2021 | Tassoumt |
| 2021/0112090 A1* | 4/2021 | Rivera ................ H04L 63/1441 |
| 2021/0173930 A1* | 6/2021 | Dahal ................... H04L 63/145 |
| 2021/0226970 A1 | 7/2021 | Ross et al. |
| 2021/0258327 A1 | 8/2021 | Felke et al. |
| 2022/0038424 A1 | 2/2022 | Liu et al. |
| 2022/0070182 A1 | 3/2022 | Bowditch et al. |

FOREIGN PATENT DOCUMENTS

| | | |
|---|---|---|
| WO | WO2007002749 A2 | 1/2007 |
| WO | WO2007090605 A1 | 8/2007 |
| WO | WO2010059843 A2 | 5/2010 |
| WO | WO2021/067238 A1 | 4/2021 |

OTHER PUBLICATIONS

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.

Lin, Tsung-Yi, et al.; "Microsoft coco: Common objects in context"; European Conference on Computer Vision, Springer, Cham, 2014; 2014.

Liu, Y., Wang, Q., Zhuang, M. and Zhu, Y.; Reengineering Legacy Systems with RESTFul Web Service; 2008 $32^{nd}$ Annual IEEE International Computer Software and Applications Conference, 2008; pp. 785-790; doi: 10.1109/COMPSAC.2008.89; 2008.

White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.

URLVoid; URLVoid.com; retrieved from archives.org: https:web. archive.org/web/20180730215132/https.://www.urlvoid.com/); Published Jul. 30, 2018.

Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

SecureWorks—Log Management—Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

* cited by examiner

SYSTEMS AND METHODS FOR IDENTIFYING MALICIOUS ACTORS OR ACTIVITIES

BACKGROUND

Security service providers (e.g., managed security service providers ("MSSPs"), security analysts, researchers, etc.) generally go through complex manual triaging processes to identify malicious actors and their activities so that preventative or remedial actions can be taken (e.g., blocking network ingress or egress, adding malicious actors to blacklists, etc.). Existing identification processes, however, can be very data intensive and take significant time for human analysts. In addition, these manual processes typically only can be performed a limited number of times within a given timespan (e.g., once a day), and the human analysts performing these manual processes often make errors leading to false identifications, further increasing the time to identify malicious actors and their activities. As a result, malicious actors, who regularly update and/or change their tactics in order to avoid detection or reaction, are able to stay head of security service provides and avoid timely detection. That is, there is a significant delta between actions taken by malicious actors and detection thereof, since malicious actors can employ techniques that do not readily appear malicious and are only apparent to victims or security service providers after significant damage has been done and/or considerable time has passed following malicious activities. Accordingly, it can be seen that a need exists for systems and methods for identifying malicious actors and activities that helps to reduce false positives and also significantly reduce the time to detection such that security service providers and their clients can take preventative or remedial actions before significant damage is done. The present disclosure is directed to the foregoing and other related, and unrelated, problems or issues in the art.

SUMMARY

Briefly described, according to various aspects, the present disclosure includes systems and methods for identifying malicious actors or malicious activities. For example, security data can be received from one or more data sources, and one or more security counter measures can be applied to the received security data, e.g., by an initial detector, for identifying signatures or patterns in the received security data and determining whether to promote identifiers (e.g., uniform resource locators ("URLs"), IP addresses, domain names, etc.) related to identified signatures or patterns to an attacker learning system. If the identified signatures or patterns and/or the identifiers related thereto are determined to meet a threshold criterion or condition, the identifiers related to the identified signatures or patterns are promoted to the attacker learning system. The attacker learning system includes a machine learning model that is applied to promoted identifiers and security data associated therewith. If the machine learning model determines that the promoted identifiers are malicious within a prescribed level of confidence, the identifiers determined to be malicious are added or otherwise included in an attacker database. Preventative or remedial actions can be taken that are responsive to malicious identifiers in the attacker database, e.g., communications, such as network egress/ingress, with malicious identifiers can be stopped, prevented, or otherwise limited; malicious actors can be included in one or more blacklists; etc.

In additional or alternative aspects, identifiers that are determined to meet the threshold criterion for promotion to the attacker learning system can be added to or otherwise included in a baseline attacker list that is submitted to or accessible by the attacker learning system.

In one aspect, the attacker learning system can extract or identify features from the security data associated with the promoted identifiers, and determine whether the promoted identifiers are malicious based on the extracted or identified features. In embodiments, the features can include the promoted identifiers, statistical features, DNS information, whois information, SSL certificates, information from online databases, such as information from Virus Total or NIST known hashes or other information from the National Software Reference Library ("NSRL"), etc., or combinations thereof.

In aspects, the attacker learning system can generate and provide performance information for an assessment or evaluation of the machine learning model, and the machine learning model can be trained or updated based on information or data related to the assessment or evaluation thereof.

According to one example, the security counter measures can include intrusion detection signatures ("IDSs"); however, any suitable security counter measures for identifying specific signatures, patterns, etc. in the received security data can be employed without departing from the scope of the present disclosure.

In some variations, the attacker learning system can develop or generate security countermeasures, e.g., specific signatures or patterns that indicate or relate to malicious activities, and provide the security counter measures to the initial detector for determining whether to promote future identifiers to the attacker learning system.

The security data can be aggregated, collected, or received from information handling systems, networks, security research analysts, threat intelligence communities, or combinations thereof.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
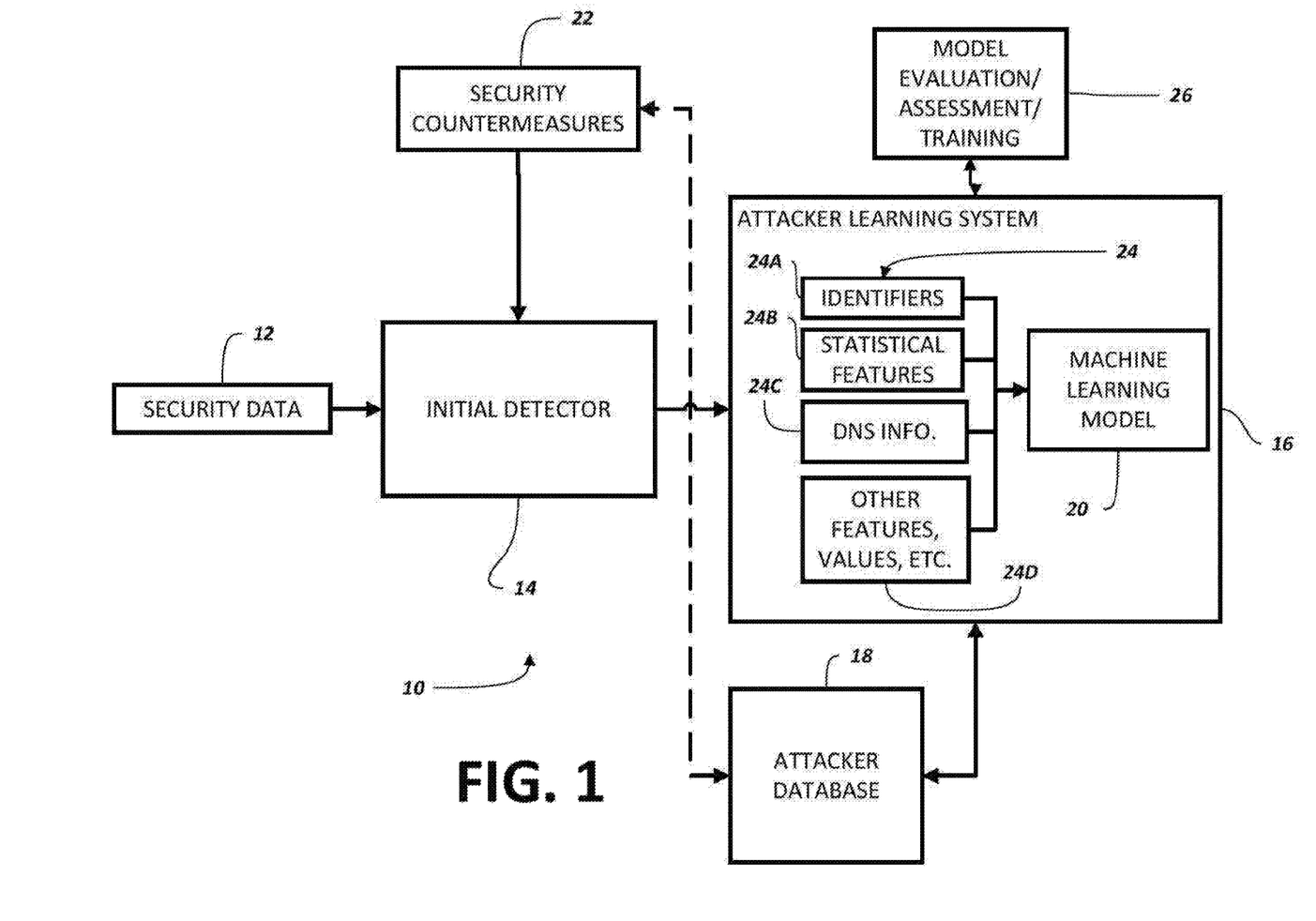
FIG. 1 shows a schematic diagram of system for identifying malicious actors or activities according to principles of the present disclosure.
Figure 2:
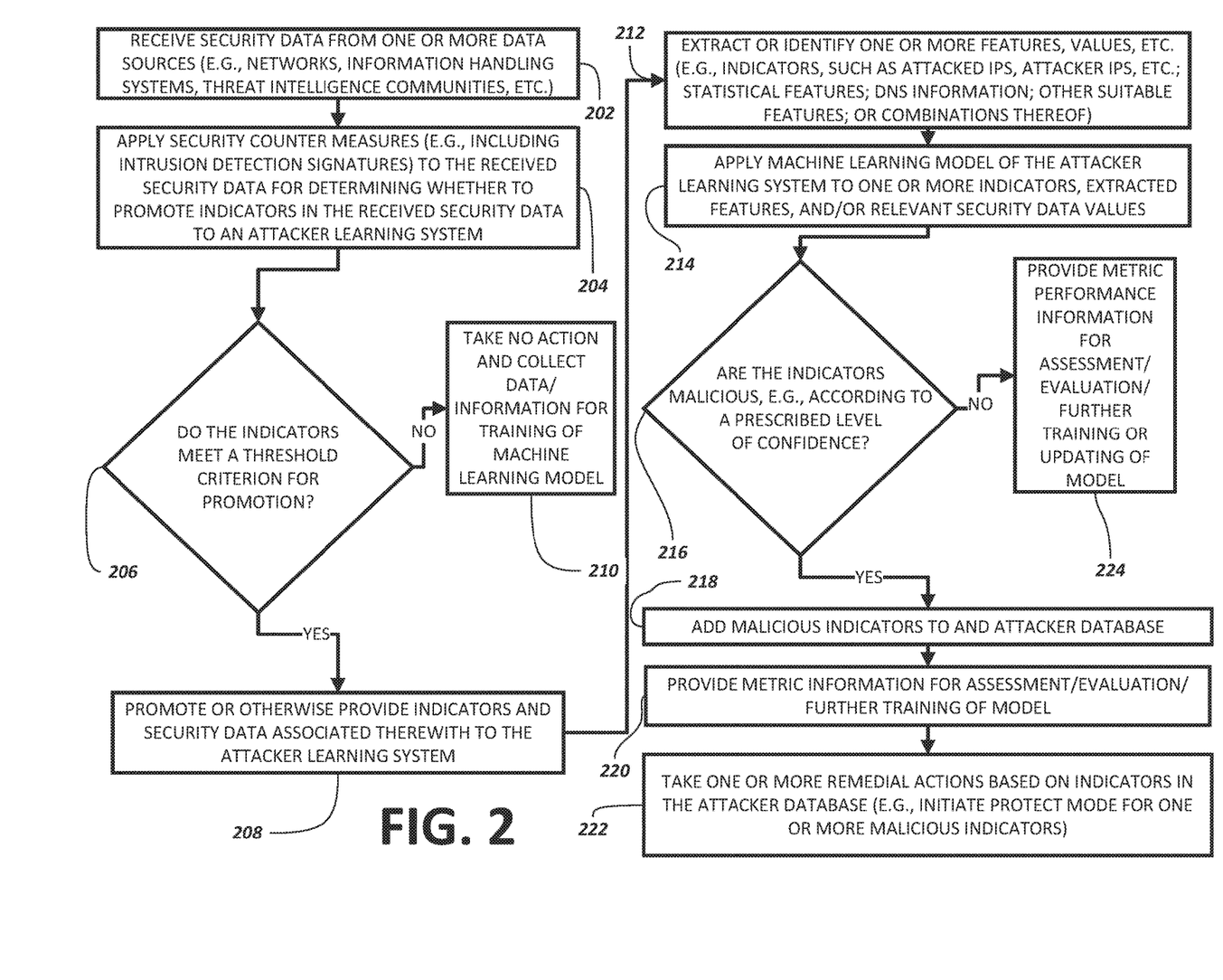
FIG. 2 illustrates a flow chart for a process or method for identifying malicious actors or activities according to principles of the present disclosure.
Figure 3:
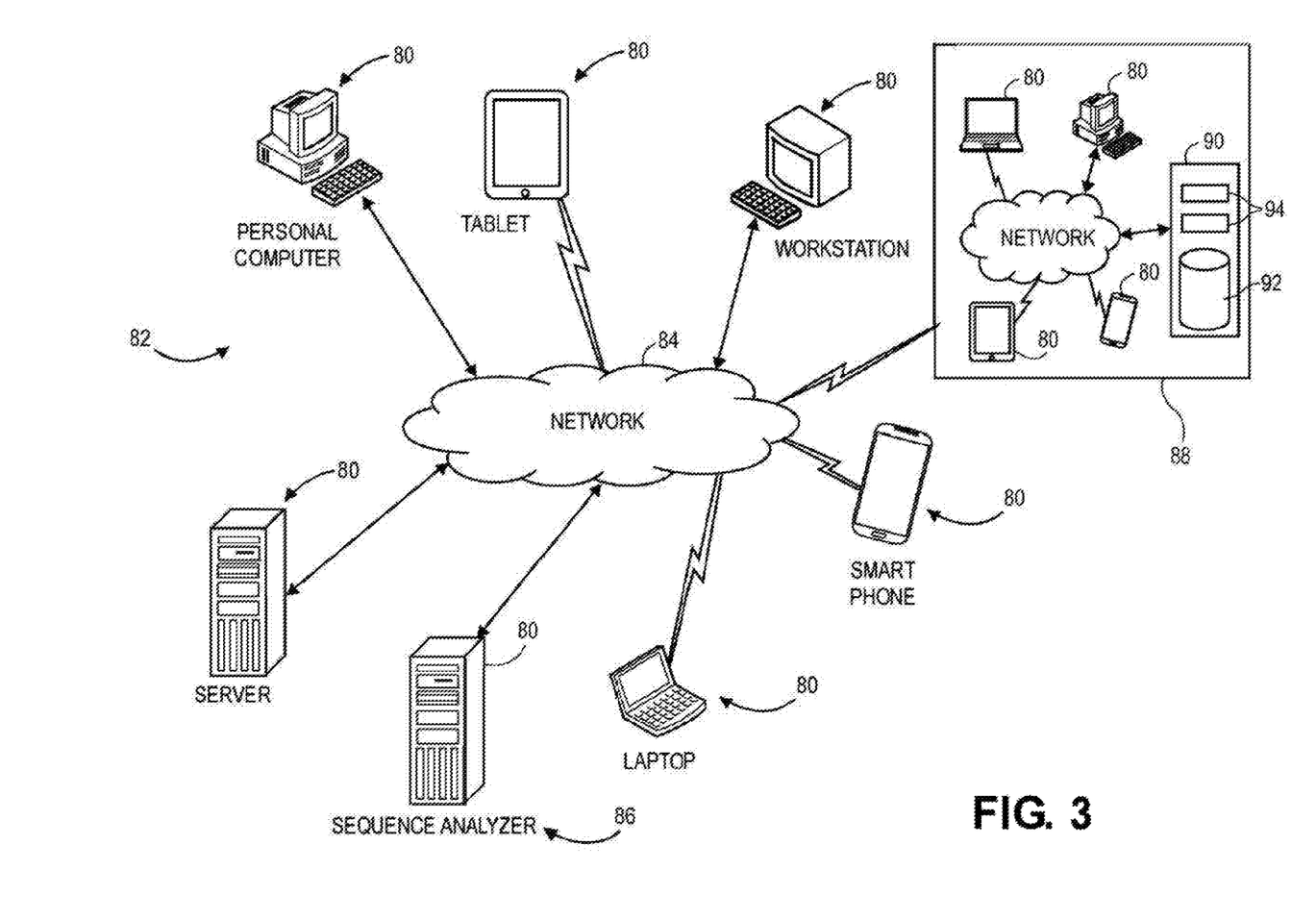
FIG. 3 shows a networked system of information handling systems according to one example of the present disclosure.

As shown in FIGS. 1-3, the present disclosure includes systems and methods for identifying malicious actors and/or malicious activities so that one or more preventative or remedial actions can be taken based on identified malicious actors or activities. More specifically, the systems and methods of the present disclosure employ machine learning to determine whether to include identifiers, e.g., URLs, IP addresses, domains, etc., related to malicious (or safe) actors, in one or more databases, data stores, etc., (e.g., including black lists, white lists, etc.), so that preventative or remedial actions can be taken that are responsive to identifiers included in the one or more databases. Any suitable identifiers or information that identifies malicious actors or entities can be used without departing from the scope of the present disclosure.

FIG. 1 shows a schematic diagram of a system 10 for identifying malicious actors and/or malicious activities based on received security data 12. The security data 12 can be aggregated, collected, or otherwise received from one or more information handling systems, networks of information handling systems (e.g., network 82 as shown in FIG. 3), threat intelligence communities, security research analysts or groups, etc. In one embodiment, the security data 12 can include security logs or other information related to the activities of one or more clients of, or other entities related to, a managed security service provider ("MSSP").

As indicated in FIG. 1, the system 10 includes an initial detector 14 and an attacker learning system 16 for processing the security data 12 to determine whether to include identifiers in, or related to, the security data 12 in an attacker database 18. The identifiers generally include URLs, IP addresses, domains, or other suitable identifying information related to malicious (or benign) actors communicating, being accessed by, or otherwise interacting with the entities, e.g., clients of a managed security service provider (MSSP), generating the security data 12. In particular, the initial detector 14 generally determines whether identifiers in, or related to, the received security data 12 meet a threshold criterion or condition(s) for promotion to the attacker learning system 16. The attacker learning system 16 includes a machine learning model 20 that processes the security data 12 or other data or information related to the promoted identifiers to determine whether to include the promoted identifiers in the attacker database 18.

FIG. 1 further indicates that the initial detector 14 generally includes programming, including one or more computer programs, applications, etc. (e.g., including instructions, workflows, etc.) that apply security countermeasures 22 to determine whether to promote identifiers in, or other related to, the received security data 12 to the attacker learning system 14. That is, if the initial detector 14 determines that identifiers or security data related thereto meet a threshold criterion for promotion based on the applied security countermeasures 22, the initial detector 14 will promote the identifiers to the attacker learning system 16.

In additional or alternative embodiments, the initial detector 14 can add identifiers that meet the threshold criterion for promotion to a baseline attacker list. This baseline attacker list can include a listing or other grouping of identifiers that meet the threshold criterion, as well as information or data related to the identifiers, such as place of origin, reason for promotion, etc. The baseline attacker list can be provided to the attacker learning system 14 for analysis/processing to determine which indictors in the baseline attacker list should be added to or otherwise include in the attacker database 18.

According to embodiments of the present disclosure, the security counter measures 22 can be designed to recognize or identify signatures or patterns that are indicative of one or more tactics, techniques, actions, etc. taken by malicious actors or other relevant communications with malicious actors. These signatures or patterns can be developed by MSSPs, security researchers or analysists, etc., and further can be shared between these entities or within one or more threat intelligence communities. The initial detector 14 can process or analyze the security data 12 against these developed signatures or patterns (e.g., the computer program(s) of the initial detector 14 can apply security countermeasures to the security data 12 to look for and determine existence of such developed signatures or patterns. In embodiments of the present disclosure, this analysis/processing can be done by comparing developed signatures or patterns with the security data 12; extracting or identifying signatures or patterns in the security data 12; using an enterprise detection and response tool, such as Red Cloak™ Threat & Detection Response by SecureWorks Corp. headquartered in Atlanta, Ga.; using Instruction Detection Systems, such as Snort or Suricata based Network Intrusion Detection Systems; or combinations thereof. If the initial detector 14 detects or identifies one or more of these signatures or patterns in the received security data 12, the initial detector 14 can promote identifiers (e.g., IP addresses, URLs, domain names, etc.) associated with the detected signature(s) or pattern(s) in the security data 12 to the attacker learning system 14 (or, optionally, to the baseline attacker list that is provided to, or otherwise accessible by, the attacker learning system 14).

In one example, the initial detector 14 will promote an identifier to the attacker learning system 16 (or the baseline list) when the initial detector 14 detects that two or more entities, e.g., clients, that generated the security data 12 share a set of develop signatures or patterns, or experienced activities that include one or more of the developed signatures or patterns from a specific identifier. For example, if two or more clients of an MSSP collecting security data 12 share specific signatures/patterns, such as a set of signatures/patterns, one or more signatures or patterns from a specific IP address, URL, or domain, either as a destination or a source, etc., the IP addresses, URLs, or domain related to the specific signatures/patterns is promoted to the attacker learning system 16 (or baseline list) for further investigation or processing, i.e., to determine whether to include the specific IP address(es), URL(s), or domain(s) in the attacker database; however, other criteria for promotion of identifiers based on detected signatures or patterns can be employed without departing from the scope of the present disclosure, e.g., if the signatures or patterns include or are other indicative of: malware; bot activity; specific types of traffic, such as chanitor traffic; certain certificates, etc.

In one embodiment, the security counter measures 22 can include intrusion detection signatures (IDSs). The IDSs can be developed by MSSPs, security researchers or analysts, or other entities to identify actions, activities, communications, etc. indicative of, or otherwise related to, malicious actors, and further can be shared between MSSPs, security researchers or analysts, etc. and/or within one or more threat intelligence communities. For example, for development of IDSs, MSSPs, security researchers or analysts, etc. can attempt to exploit or find vulnerabilities in test systems or networks (e.g., developed by the MSSPs, security researchers or analysts, etc.), and based on these exploited or discovered vulnerabilities, develop, write or otherwise generate regular expression type signatures, e.g., Snort, Suricata, etc. indicative or otherwise related to the vulnerabilities of the test systems/networks. In addition, or in the alternative, MSSPs, security researchers or analysts, etc. can detonate or test known malware to identify attributes, sequences, etc., (e.g., specific captures the malware produces as it attempts to make network activities, byte sequences within encryption algorithms, etc.) that are particular to, or otherwise indicative of, actions of the known malware, and based on commonalities between these attributes, sequences, etc., write or develop signatures that are representative of actions taken by known malware.

In addition, or in the alternative, other sources of security countermeasures 22 can be employed, such as YARA rules, Sigma rules, tactic graphs. The security counter measures 22 further can include information from the attacker learning system 14. For example, the attacker learning system 14 can communicate information related to identifiers that are determined to be malicious to be included in the security counter measures 22, e.g., a detected hash or other data indicative of communication with a malicious IP address.

As further indicated in FIG. 1, the attacker learning system 14 receives the promoted identifiers from the initial detector 14 and determines whether to add or otherwise include one or more of the promoted identifiers in the attacker database 18. More specifically, the attacker learning system 14 applies the machine learning model 20 to the promoted identifiers and security data associated therewith, or other information or data, for determining whether the promoted identifiers are malicious, or are otherwise involved in malicious activities, e.g., according to a prescribed probability or level of confidence, and should be included in the attacker database 18.

In an example embodiment, the machine learning model 20 includes a supervised or semi-supervised machine learning model, such as one or more neural networks, linear regression models, support vector machines (SVMs), etc. However, any suitable supervised or unsupervised (e.g., descriptive models, clustering algorithms, Association rule learning algorithms, etc.) learning models, active learning models, reinforcement models, etc. can be used without departing from the scope of the present disclosure.

FIG. 1 further shows that the attacker learning system 16 can identify, extract, or otherwise obtain one or more features, values, etc. 24 and provide the identified features 24 to the machine learning model 20 for determining whether the promoted identifiers are malicious. In one embodiment, the features 24 can include the identifiers 24A (e.g., IP addresses or domain names) or other suitable identifying information related to the identifiers 24A in the security data, statistical features 24B, domain name system ("DNS") information 24C, and/or other features 24D, values, etc. related to the identifiers that are, or are not, indicative of malicious activities. The features further can include whois information, SSL certificates, information from online databases, such as VirusTotal or NSRL. The attacker learning system 16 can scan or otherwise review the security data 12 or portions thereof for extracting the features 24 and can provided the extracted features 24 to the machine learning model 20 as one or more inputs.

Additionally, or in the alternative, the machine learning model 20 can ingest or otherwise review the security data 12 or portions thereof for identification of the features 24. The attacker learning system 16 and/or the machine learning model 20 also can include or communicate with one or more data stores, databases, etc. to obtain features 24 related to the identifiers, e.g., the attacker learning system 16 and/or the machine learning model 20 can access or otherwise communicate with a Domain Name System or Database for obtaining the DNS information.

In one example, the statistical information 24B can include information related to a frequency of activity or hits of the promoted identifiers across the security data 12, such as a noise level of identifiers, an average number daily hits of identifiers, an amount or number of clients communicating with identifiers, etc. For example, if an identifier's activities are noisy, generating a large number of hits across a higher number of clients from which the security data 12 is collected, the machine learning model 20 may be more likely to determine that this identifier is not malicious and should not be added to the attacker database 18. However, if the identifier's activities are less noisy and experienced across only a few clients, the machine learning model 20 may be more likely to determine that the identifier is malicious and should be included in the attacker database 18.

The DNS information can include IP addresses associated with the identifiers, e.g., the DNS information can include a specific IP address for a URL or domain name. If the DNS information, e.g., a specific IP address or addresses, is known to be related to a safe actor, the machine learning model 20 is more likely to determine that the identifiers associated with the DNS information are not malicious and should not be include in the attacker database 18. If the DNS information, e.g., a specific IP address or addresses, is unknown or known to be related to a malicious actor(s), the machine learning model 20 is more likely to determine that the identifiers are malicious and should be included in the attacker database 18.

The other features, values, etc. 24D of the features 24 input to the machine learning model 20 can include temporal information, such as time and date information related to the activity of the identifiers. For example, if the activity of the identifiers is occurring at times/dates that are indicative of malicious activity, e.g., early in the morning, outside of regular business hours, etc., the machine learning model 20 may be more likely to determine that the identifiers are malicious and should be included in the attacker database 18. The other features, values, etc., 24D also can include other information indicative or related to safe or malicious activities. The other features 24D also can include other suitable information or data. For example, for identifiers that include domain names, whois information can be identified or obtained by the attacker learning system 14. If is a website or web service is using encryption, the attacker learning system 14 can obtain SSL certificates. Still further, for cryptographic hashes, that attacker learning system 14 can obtain information or data from online databases, such as VirusTotal or NSRL (e.g., NIST known hashes from NSRL). However, any other suitable features, values, etc., e.g., features indicative of malicious or benign activities, can be used without departing from the scope of the presented disclosure.

Accordingly, based on the identified, extracted, or obtained features 24, and/or other relevant security data, values, information etc., the machine learning model 20 determines or generates a specific probability or level of confidence of whether the promoted identifiers are malicious, and the attacker learning system 16 takes one or more actions based on the determined probability or level of confidence. For example, if the probability or confidence level that an identifier is malicious, or is taking part in malicious activities, determined or generated by the machine learning model 20's is greater than, or equal to, a prescribed threshold value, e.g., in some embodiments, about 90%, about 95%, about 99% or above, the attacker learning system 16 will add or otherwise include the identifier in the attacker learning database 18. If the determined probability is below the selected or prescribed threshold value, the attacker learning system 16 generally will not add or include the identifier in the attacker database 18. This prescribed threshold value can be selected, changed, or updated by an operator (e.g., an MSSP) of the system 10. In some variations, the attacker learning system 16 can remove identifiers from the attacker database 18 if they are determined to have a probability below the threshold value. As a result, the attacker database 18 can be continuously or dynamically updated based on application of the machine learning model 20 to the security data 12 or portions thereof.

In addition, or in alternative variations, the attacker learning system 16 can take other additional or alternative actions based on the determined probability or confidence level. For example, if the determined probability or confidence level is within a specific interval or range of the threshold value, e.g., plus or minus about 1%, about 2%, or about 3%, within a specific, e.g., one or two, standard deviations, etc., or at or above an additional threshold value, e.g., about 50%, about 60%, about 70%, or more, the attacker learning system 16 can submit the identifier and security data associated therewith to a model evaluation, assessment, and training program 26 for assessment by human analysts. The analysts can review the identifier and security data associated therewith, e.g., including the identified features 24, to determine whether the identifier should be included in the attacker database 18. The analysts further can add the identifier to the attacker database 18 if appropriate, and can provide labeled data to the machine learning model 20 (e.g., labeled data indicating that the features 24 relate to a safe or malicious actor) for further training or updating of the machine learning model 20.

Still further, if the probability that the identifier is malicious is determined to be at or below a low end threshold value, e.g., about 25%, about 10%, about 5%, etc., the identifier can be added to and/or included in one or more white lists of safe actors. The initial detector 14 also can be enabled to access such white lists and may not promote identifiers therein for analysis by the attacker database 18; though identifiers in white lists can be promoted and the white lists can be updated as necessary.

According to embodiments of the present disclosure, the attacker learning system 16 also will provide metric or performance information to the evaluation, assessment, or training programs 26 to allow human analysts to continuously check or test the accuracy or efficacy of the machine learning model 20 in identifying malicious actors or activities. For example, metric information can be provided to the evaluation, assessment, or training programs 26 at a given time interval, e.g., daily, weekly, monthly, etc., or after a prescribed number of iterations of the machine learning model 20.

To train, update, and/or improve the accuracy/efficacy of the machine learning model 20, e.g., initially or if the model 20 is not meeting a prescribed accuracy/efficacy, analysts can develop training sets of labeled data (e.g., one or more features 24 labeled as being malicious or safe) and provide the training sets of labeled data to the machine learning model 26. The analysts further can develop testing sets of data (e.g., non-labeled sets of indicators that the analysts found to be malicious or safe) and apply the machine learning model 20 to the testing sets of data for determining an accuracy, efficacy, etc., of the machine learning model 20.

In some aspects, the attacker learning system 16 can automatically develop security counter measures 22 that are used by the initial detector 14. For example, the attacker learning system 16 can generate patterns, signatures, etc., that are indicative of malicious activities, and thus, the security counter measures 22 can be expanded on or updated with applications of the machine learning model 20, e.g., to help to improve on the selection of identifiers that are to be promoted to the attacker learning system 16, or to even detect malicious identifiers without promotion to the attacker learning system 16.

In addition, the system 10 may take one or more preventative or remedial actions based on identifiers listed in the attacker database 18 or otherwise indicated as being malicious. For example, the system 10 may communicate with one or more information handling systems, networks, or other systems in communication therewith to initiate a protect or prevent mode for identifiers list in the attacker database 18 (e.g., such that communications between the information handling systems, networks, or other systems and the malicious actors associated with the identifiers are stopped, prohibited, or substantially reduced). In one embodiment, network egress and/or ingress of malicious identifiers in the attacker data base 18 can be blocked. Furthermore, blacklists and/or white lists can be compiled based on the attacker database 18 or results of the model 20 and shared between members of one or more threat intelligence communities, e.g., for the development of tools, programs, etc., to combat malicious actors provided in the black lists.

It will be understood that the accuracy, efficacy, etc. of the machine learning model 20 generally improves with each application thereof and as the machine learning model 20 processes more and more security data 12. Accordingly, the system 10 will be able to more quickly and more accurately identify malicious actors and malicious activities as time goes on, potentially providing MSSPs, security analysts, etc. an advantage in combating malicious actors, and helping the system 10 or MSSPs, security analysts, etc. to take preventative or remedial actions before significant damage or loss occurs.

FIG. 2 shows a schematic diagram of a method or process for identification of malicious actors or activities. As shown in FIG. 2, at 202, security data can be received from one or more data sources, such as networks, information handling systems, threat intelligence communities, security analysts, etc. At 204, security countermeasures can be applied to the received security data for determining whether to promote identifiers in received security data to the attacker learning system 16. For example, the initial detector applies one or more security counter measures (e.g., including intrusion detection) to the received security data to identify signatures or patterns in the received security data for determining whether to promote identifiers related to the security data to an attacker learning system.

If the initial detector 14 determines that identifiers meet a threshold criterion for promotion, at 206, the identifiers and security data associated therewith are submitted or otherwise provided to the attacker learning system 16. For example, if the initial detector 14 determines that activities or communications of the identifiers match or are otherwise related to the patterns or signatures of the security countermeasures, the identifiers can be promoted to the attacker learning system 18 at 208. In one embodiment, if two or more clients or entities of a security service provider experience activities or communications indicative of a specific signature or pattern and/or activities or communications from a malicious actor that match or are other related to specific patterns or signatures, the identifier(s) for that malicious actor is promoted to the attacker learning system 16.

However, if the identifiers do not meet the threshold criterion for promotion at 206, the identifiers will not be promoted to the attacker learning system 16 and will be able to continue communications as normal at 210. Furthermore, at 210, data or information may be collected for training, updating, etc. of the machine learning model 20.

For the identifiers received by the attacker learning system 16, one or more features, values, etc. (e.g., identifiers such as attacked IPs, attacker IPs, etc.; statistical features; DNS based information; other suitable features; or combinations thereof) can be extracted or identified by the attacker learning system 16 as indicated at 212. Thereafter, at 214, the attacker learning system 16 can apply the machine learning model 20 to the one or more identifiers, extracted features, and/or other relevant security data values to determining whether the identifiers are malicious (e.g., to determine or generate a probability or confidence level that the identifiers are malicious).

As further shown in FIG. 2, if identifiers are determined to be malicious according to a prescribed level of confidence or probability at 216, the attacker learning system 16 can add the malicious identifiers to the attacker database 18. As shown at 220, metric information can be provided for assessment, evaluation, and further training of the model. Furthermore, the system 10 can take one or more remedial or preventative actions based on identifiers added to the attacker database 18 at 222. For example, the system can initiate a protect mode for one or more of the malicious identifiers. That is, communications between information handling systems, networks, or other computer infrastructure, and malicious actors associated with the identifiers can be substantially inhibited, reduced, and/or prohibited.

If the identifiers are not determined to be malicious according to the prescribed level of confidence or probability at 216, the identifiers generally will not be added to the attacker database 18 as indicated at 218. However, as shown in FIG. 2, the identifiers and metric performance information may be provided to an assessment, evaluation, or training program 26 for review by human analysts to determine the efficacy of the machine learning model 20.

According to embodiments of the present disclosure, the various components of the system 10 (such as the initial detector 14, attacker learning system 26, evaluation program 26 shown in FIG. 1) can include computer programmable instructions, workflows, etc. that can be stored in memory and executed or accessed by one or more processors (generally referred to as "a processor") of one or more information handling systems 80, e.g., as generally shown in FIG. 3. It will be understood that in some instances the system 10 shown in FIG. 1 can be implemented as a part of an individual information handling system/device, e.g., when there are sufficient processor and memory computing resources therein. In other instances, however, the system 10 may be deployed across a variety of information handling systems/devices (i.e. deployment of a system irrespective of physical presence or "cloud" infrastructure).

For purposes of this disclosure, an information handling system 80 (FIG. 3) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system also may include one or more buses operable to transmit communications between the various hardware components.

As shown in FIG. 3, in some embodiments, the system 10 can include a networked system 82 of information handling systems/devices 80 or other communicable systems/devices. A network 84 may provide data communications among the information handling systems/devices 80, which can include workstations, personal computers, smart cellular telephones, personal digital assistants, laptop computers, servers, and other suitable devices. The network 84 can include a private or public network, such as a local area network, or other suitable network(s), such as the Internet or another wide area network, virtual personal network, peer to peer filing sharing system, and/or other suitable communication lines, or combinations thereof. FIG. 3 also indicates that the linked or networked information handling systems 80 may include one or more monitoring devices 86 communicatively coupled to the network 84. The monitoring device(s) 86 can be managed by a Managed Security Service Provided ("MSSP").

In one embodiment, the monitoring device(s) 86 may include a server or sequence analyzer or other client suitable computing device that has a processor and a memory or other suitable storage. The memory can include a random access memory (RAM), read only memory (ROM), and/or other non-transitory computer readable medium. The monitoring device(s) 56 further typically will be operable to store and execute computer readable instructions to continuously monitor, in real-time, activity at each networked system, for example, activity of the information handling systems 80 connected to network 84. The monitoring device(s) 86 can ingest or aggregate information or data logs related to activities of the information handling systems 80 and can provide these ingested/aggregate data logs or information or data related thereto to by the system 10 for processing thereby. In addition, or in the alternative, the system 10 can include a data center 88, such as a data center 88 management by an MSSP, with a plurality of networked information handling systems 80, e.g., including one or more servers 90 with at least one memory 92 and one or more processors 94 for receiving information or data logs related to activities of the information handling systems 80 of system 82. These information/data logs can be a part of the security data 12 provided to the system 10.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method for identifying malicious actors or malicious activities, comprising:
    receiving security data from one or more data sources;
    applying, by an initial detector, one or more security counter measures to the received security data for identifying signatures or patterns in the received security data and determining whether to promote identifiers related to identified signatures or patterns to an attacker learning system;
    if the identified signatures, patterns, and/or the identifiers related thereto are determined to meet a threshold criterion, promoting the identifiers related to identified signatures or patterns to the attacker learning system from the initial detector;
    in response to reception of promoted identifiers by the attacker learning system from the initial detector, applying a machine learning model of the attacker learning system to promoted identifiers and security data associated therewith;
    if the machine learning model determines that the promoted identifiers are malicious within a prescribed level of confidence, adding the identifiers that are determined to be malicious to an attacker database; and
    taking one or more preventative or remedial actions responsive to malicious identifiers in the attacker database.

2. The method of claim 1, further comprising:
    adding the identifiers that are determined to meet the threshold criterion for promotion to the attacker learning system to a baseline attacker list that is submitted to or accessible by the attacker learning system.

3. The method of claim 1, further comprising:
    extracting or identifying features from the security data associated with the promoted identifiers; and
    determining whether the promoted identifiers are malicious based on the extracted or identified features.

4. The method of claim 3, wherein the features include the promoted identifiers, statistical features, DNS information, whois information, SSL certificates, information from online databases, temporal information, or combinations thereof.

5. The method of claim 1, further comprising:
    providing performance information for an assessment or evaluation of the machine learning model to a program, wherein the performance information indicates one or more of accuracy or efficacy of the machine learning model;
    updating the machine learning model based on information or data, from the program, related to the assessment or evaluation thereof.

6. The method of claim 1, wherein the one or more security counter measures include one or more intrusion detection signatures.

7. The method of claim 1, wherein the security data is received from information handling systems, networks, security research analysts, threat intelligence communities, or combinations thereof.

8. The method of claim 1, wherein the identifiers include IP addresses or domains.

9. The method of claim 8, wherein the one or more remedial actions include stopping, preventing, or limiting communications with the IP addresses or domains.

10. The method of claim 1, further comprising:
    compiling one or more of a white list or black list based on one or more of the attacker database or results of application of promoted identifiers to the machine learning model.

11. The method of claim 1, further comprising:
    prior to determining whether to promote identifiers:
        accessing, by the initial detector, a white list; and
        determining, by the initial detector, whether the identifiers are included in the white list, wherein determining to promote identifiers is further based on whether the identifiers are included in the white list.

12. The method of claim 1, wherein determining to promote identifiers is further based on whether the identified signatures or patterns include one or more of malware, bot activity, specific types of traffic, or certain certificates.

13. A system for identifying malicious actors, comprising:
    one or more processors and at least one memory having stored therein instructions that when executed by the one or more processors, cause the system to:
    receive security data from one or more data sources;
    apply one or more security counter measures to the received security data for identifying signatures or patterns in the received security data and determining whether to promote identifiers related to identified signatures or patterns to an attacker learning system;
    if the identified signatures or patterns and/or the identifiers related thereto are determined to meet a threshold criterion:
        promote the identifiers related to identified signatures or patterns to the attacker learning system;
        add the one or more identifiers related to identified signatures or patterns to a baseline attacker list to be submitted to or accessed by the attacker learning system;
        apply a machine learning model at the attacker learning system to one or more of the promoted identifiers and security data associated therewith or the one or more identifiers in the baseline attacker list; and
        add identifiers that are determined to be malicious to an attacker database if the machine learning model determines that the promoted identifiers are malicious within a prescribed level of confidence; and
    take one or more preventative or remedial actions responsive to malicious identifiers in the attacker database.

14. The system of claim 13, wherein the attacker learning system extracts or identifies one or more features from the security data associated with the one or more identifiers; and determine whether the one or more identifiers are malicious at the prescribed level of confidence based on the extracted or identified features.

15. The system of claim 14, wherein the one or more features include identifiers, statistical features, DNS information, whois information, SSL certificates, information from online databases, or combinations thereof.

16. The system of claim 13, wherein the attacker learning system provides performance information for an assessment or evaluation of the machine learning model, and the machine learning model of the attacker learning system is updated or trained based on information or data related to the assessment or evaluation thereof.

17. The system of claim 13, wherein the one or more security counter measures include intrusion detection signatures.

18. The system of claim 13, wherein the security data is received from one or more information handling systems, networks, security research analysts, threat intelligence communities, or combinations thereof.

19. The system of claim 13, wherein the identifiers include URLs, IP addresses, domains, domain names, or combinations thereof.

20. The system of claim 19, wherein the one or more preventative or remedial actions include stopping, preventing, or limiting communications with the identifiers.

21. A method for identifying malicious actors or malicious activities, comprising:

receiving security data from one or more data sources;

applying, by an initial detector, one or more security counter measures to the received security data for identifying signatures or patterns in the received security data and determining whether to promote identifiers related to identified signatures or patterns to an attacker learning system;

if the identified signatures, patterns, and/or the identifiers related thereto are determined to meet a threshold criterion, promoting the identifiers related to identified signatures or patterns to the attacker learning system;

applying a machine learning model of the attacker learning system to promoted identifiers and security data associated therewith;

if the machine learning model determines that the promoted identifiers are malicious within a prescribed level of confidence, adding the identifiers that are determined to be malicious to an attacker database;

taking one or more preventative or remedial actions responsive to malicious identifiers in the attacker database;

providing performance information for an assessment or evaluation of the machine learning model, wherein the performance information indicates one or more of accuracy or efficacy of the machine learning model; and updating the machine learning model based on information or data related to the assessment or evaluation thereof.

22. The method of claim 21, wherein the information or data related to the assessment or evaluation thereof includes one or more sets of labeled data.

\* \* \* \* \*